United States Patent [19]

Shu et al.

[11] Patent Number: 5,170,482
[45] Date of Patent: Dec. 8, 1992

[54] IMPROVED HYPERCUBE TOPOLOGY FOR MULTIPROCESSOR COMPUTER SYSTEMS

[75] Inventors: Renben Shu, St. Paul; David H. C. Du, New Brighton, both of Minn.

[73] Assignee: Regents of the University of Minnesota, St. Paul, Minn.

[21] Appl. No.: 655,258

[22] Filed: Feb. 13, 1991

Related U.S. Application Data

[63] Continuation of Ser. No. 85,980, Aug. 14, 1987, abandoned.

[51] Int. Cl.$^5$ ............................................. G06F 13/00
[52] U.S. Cl. ............................ 395/800; 364/DIG. 1; 364/DIG. 2; 364/931; 364/931.4; 364/931.41; 364/229
[58] Field of Search ............................ 364/200, 900; 395/DIG. 1, DIG. 2, 800, 700, 325

[56] References Cited

U.S. PATENT DOCUMENTS

| | | | |
|---|---|---|---|
| 4,247,892 | 1/1981 | Lawrence | 364/200 |
| 4,574,311 | 3/1986 | Resnikoff et al. | 358/213 |
| 4,598,400 | 7/1986 | Hillis | 370/60 |
| 4,691,291 | 9/1987 | Wolfrom | 364/717 |
| 4,729,095 | 3/1988 | Colley et al. | 364/200 |
| 4,730,322 | 3/1988 | Pollara-Bizzola | 371/43 |
| 4,739,476 | 4/1988 | Fiduccia | 364/200 |

(List continued on next page.)

FOREIGN PATENT DOCUMENTS

| | | |
|---|---|---|
| 30132926 | 5/1984 | European Pat. Off. . |
| 0251594 | 1/1988 | European Pat. Off. . |
| 63-186365 | 8/1988 | Japan . |

(List continued on next page.)

OTHER PUBLICATIONS

Franco P. Preparata, et al., "The Cube-Connected Cycles: A Versatile Network For Parallel Computation," Comm. of ACM vol. 24, No. 5 May 1981.

Marshall C. Pease, "The Indirect Binary n-Cube Microprocess Array," IEEE Transaction on Computers, May 1977.

Stephen Colley, et al., "A Microprocessor-based Hypercube Supercomputer," IEEE Micro, Oct. 1986.

"Combining Parallel and Sequential Sorting on a Boolean n-Cube", Johnsson; IEEE, copyright 1984.

"Dense Trivalent Graphs for Processor Interconnection", Leland and Solomon; IEEE Transactions on Computers, vo. C-31, No. 3, Mar. 1982.

"A Survey of Interconnection Networks", Tse-yun Feng, *IEEE*, Dec. 1981.

(List continued on next page.)

*Primary Examiner*—Thomas C. Lee
*Assistant Examiner*—Robert B. Harrell
*Attorney, Agent, or Firm*—Merchant, Gould, Smith, Edell, Welter & Schmidt

[57] ABSTRACT

A hypercube system which has been modified by adding additional communication links between the most distant nodes of a classic hypercube topology is described herein. This improvement in a hypercube topology is termed as a Modified Hypercube topology. Such a topology contains extra links which connects a node to another node in the topology which requires the greatest number of nodal hops over the shortest path. Also stated another way, that node having the greatest number of singly traversed or hopped nodes along the shortest path from an originating node to that node makes that node the most distant processor node. If hamming were to be implemented in the system, there is added an extra link between two nodes having the greatest hamming distance. Such a system makes a technological trade off to reduce the diameter of a classic hypercube at the cost of incrementally increasing the number of I/O ports at each node. This trade off has been recognized in the industry as advantageous since a great gain in performance is achieved n exchange for an incremental impact to the hardware. Clearly the performance advantages of the present invention grows as the number of nodes in the hypercube grows and the maximum distance between nodes increases.

14 Claims, 6 Drawing Sheets

U.S PATENT DOCUMENTS

| | | |
|---|---|---|
| 4,766,534 | 8/1988 | DeBenedictis ................... 364/200 |
| 4,773,038 | 9/1988 | Hillis et al. ...................... 364/900 |
| 4,773,873 | 9/1988 | Hillis ............................... 439/260 |
| 4,791,641 | 12/1988 | Hillis ............................... 371/38 |
| 4,805,091 | 2/1989 | Thiel et al. ...................... 364/200 |
| 4,805,173 | 2/1989 | Hillis et al. ...................... 371/38 |
| 4,809,202 | 2/1989 | Wolfram ......................... 364/578 |
| 4,814,980 | 3/1989 | Peterson et al. ................. 364/200 |
| 4,827,403 | 5/1989 | Steele, Jr. et al. ............... 364/200 |

FOREIGN PATENT DOCUMENTS

| | | |
|---|---|---|
| WO8808566 | 3/1988 | PCT Int'l Appl. . |
| WO8804077 | 6/1988 | PCT Int'l Appl. . |
| WO8808652 | 11/1988 | PCT Int'l Appl. . |

OTHER PUBLICATIONS

"Architecture of a Hypercube Supercomputer", Hayes, Madge, Stout, et al., IEEE, copyright 1986.

Collection of slides taken from an N-Cube Corporation presentation, identified on first page with the N-Cube founders.

Selected portion of book entitled *The Connection Machine*, by Hills, MIT Press.

Pamphlet: "N—Cube Ten-True Parallel Computing", from N—Cube Corporation.

"Performance of the Direct Binary n-Cube Network for Multiprocessors," Abraham and Padmanabhan; *IEEE*, copyright 1986.

"Distributed Routing Algorithms for Broadcasting and Personalized Communication in Hypercubes", Ho and Johnson; *IEEE*, copyright 1986.

"The Architecture of a Homogeneous Vector Supercomputer", Gustafson, Hawkinson and Scott; *IEEE*, copyright 1986.

"Scalability of a Binary Tree on a Hypercube", Deshpande and Jenevein; IEEE, copyright 1986.

"Multigrid Algorithms on the Hypercube Multiprocessor", Chan and Saad; IEEE Transactions on Computers, vol. C(?), No. 11, Nov. 1986.

"How Robust is the n—Cube?", Becker and Simon; IEEE, copyright 1986.

"On Folded Hypercubers", by Latifi and El-Amawy, published in the 1989 International Conference on Parallel Processing.

"Properties and Performance of Folded Hypercubes", by El-Amawy and Latifi, published in the IEEE Transactions on Parallel and Distributed Systems.

(PRIOR ART)

IMPROVED HYPERCUBE TOPOLOGY FOR MULTIPROCESSOR COMPUTER SYSTEMS

This is a continuation of application Ser. No. 07/085,980, filed Aug. 14, 1987, now abandoned.

FIELD OF THE INVENTION

The present invention pertains to the field of high-speed digital data processors, and more particularly to interprocessor communication networks for multiprocessor or multicomputer designs.

BACKGROUND OF THE INVENTION

The design of multiprocessor computers with a large number of parallel processing elements requires fast and efficient communication throughout the multiprocessor network. The largest bottleneck in the processing ability of large multiprocessor systems is the interprocessor communication. There exists in the prior art a wide variety of interprocessor communication network topologies which yield various levels of performance. The trend is to build large system configurations of multiprocessors operating in parallel in the range of thousands of processors.

In a multiprocessor or multicomputer design (the present discussion centers on topology structure so no differentiation is made between multiprocessors and multicomputers) using thousands of parallel processing elements, the physical packaging of the hardware becomes a major concern to interprocessor communication. For example, the preferred cost-effective method of implementing a large parallel processor is to use microprocessor packaged in individual VLSI packages with a small number of memory and other support chips for each processor. The number of other microprocessor packages that a single package can communicate with depends on the number of available input/output (I/O) ports available. For the fastest direct communication between two microprocessors, dedicated pins on the LSI package are used to form the communication interconnect. Thus, the number of communications ports that a microprocessor can support is directly dependent on the pin limitations of the packages. LSI packages of the prior art have been built with more than 300 pins, however, in multiprocessor designs using tens of thousands of processors, pin limitations are still a factor limiting the size of the design even if the I/O ports are multiplexed on shared pins. This is a very important factor as to why a single processor element in a multiprocessor design cannot have a large number of ports.

Interprocessor communication can be divided into two main categories of topologies, commonly entitled direct and indirect. The direct network connection topology has been widely researched and considered for telephone switching connections. These connections are typically found to be tightly coupled, slow-speed communications networks designed either as single-stage or multi-stage designs. The most commonly used direct interconnect topology is the crossbar interconnect widely used in older telephone exchange centreal offices. When the number of nodes increases in a direct interconnection topology, the number of possible interconnections grow very quickly. These types of prior art direct interconnection techniques are very expensive for loosely-coupled or distributed multiprocessor designs with a very large number of processors.

The indirect interconnection topology is typically described in terms of the physical layout of the interconnected nodes of the system. These interconnect schemes are usually described in terms of the degree required for implementation, i.e., degree one, degree two, degree three, hypercube, etc. The most promise for very large multiprocessor system interconnect topologies has been found in the hypercube topology.

Several prior art multiprocessors have been designed based upon the hypercube topology. Exemplary of these types of multiprocessors is the NCUBE/10 parallel processing computer manufactured by NCUBE Corporation of Beaverton, Oregon. This multiprocessor system uses a 10-dimensional hypercube, or 10-cube, when fully configured. The NCUBE/10 machine can operate using 1,024 microprocessors operating in parallel providing an overall performance of upwards of 500 million floating point operations per second (MLFOPS) or 2,000 million integer instructions per second (MIPS). However, a multiprocessor of this capability is still limited in its ability to grow to a larger size due to I/O limitations between the microprocessors.

Several variations on multi-degree topologies from multiprocessors have been proposed in the prior art to reduce the longest path between microprocessors and the number of interconnections between microprocessors in order to improve performance and to allow the number of microprocessors to grow larger. These proposals for multiprocessor interconnection topologies are typically shown in the form of a graph in which nodes represent switching points or processing elements and edges represent communication links. Since the topologies tend to be regular, the descriptions lend themselves to graphical displays representing systems such as the types shown in the Figures attached to the present patent application. Those skilled in the art readily recognize the conversion of graphical representations of system topologies into hardware. Hence, this shorthand notation is a convenient method of representing larger and more complex hardware multiprocessor systems without the associated complexity of unnecessary details.

To best understand the prior art of interconnection topologies for multiprocessor systems, the present patent application includes a detailed discussion of the prior art to more carefully place the present invention in light of its advancements over the prior art.

SUMMARY OF THE INVENTION

An improved topology for multiprocessor systems is described to facilitate interprocessor communication for parallel processing computers. In one preferred embodiment of the present invention, an interprocessor communication system for use in multiprocessor designs is constructed by modifying an n-dimensional hypercube. This modified hypercube is constructed using $2^n$-nodes arranged as an n-dimensional hypercube (n-cube). Additional communication paths are inserted into the hypercube structure to reduce the diameter of the hypercube by increasing the number of ports (degree) for each node. This is an acceptable trade-off when the number of nodes within the system increases.

In a second preferred embodiment of the present invention, the corners of the modified hypercube are substituted with topologies having cycle paths in order to reduce the degree of the overall structure.

BRIEF DESCRIPTION OF THE DRAWINGS

In the drawings, where like numerals refer to like components throughout the several views:

FIGS. 1A, 1B, 1C, 1D, 1E and 1F show a variety of prior art network topologies such as the chordal ring, the cube-connected cycle (CCC), the ring (cycle), the tree, the mesh (grid) and the completely connected network topology.

DETAILED DISCUSSION OF THE PRIOR ART

Figures 2A, 2B:
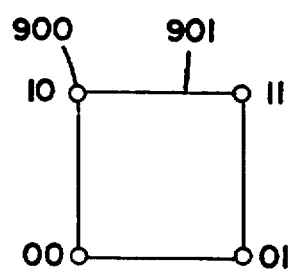
FIG. 2A, 2B, 2C, 2D shows prior art hypercubes of one-, two-, three-, and four-dimensional configurations.

In the recent years there has been a growing interest in developing multiprocessor or multicomputer systems. The quest for increased computational power in scientific computing and the limits of physical electronic devices have lead to the exploration of new architectures as alternatives to traditional monolithic designs. Multiprocessor designs hold the promise of tremendous performance increase, provided the interconnection communication can support the parallelism inherent in the computation.

The communication medium may be shared memory by using direct interconnection network (such as omega network, crossbar, indirect binary hypercube, etc.), a broadcast bus or an indirect interconnection network. Broadcast bus schemes are not expensive but it is difficult to get high performance when the system is large, while the shared memory systems are expensive when scaled to large dimensions because of the rapid growth of the interconnection network. Large system configurations (for example, with thousands of processors) are readily realized with the distributed memory based on a limited form of interconnection, such as the pyramid or binary hypercube. With this view, much current computer architecture research has focused on the use of identical processors in homogeneous configurations that employ message passing over limited forms of indirect interconnections. The present patent application is directed to such indirect interconnection topologies which can be used for small (for example, with ten processors) to very large multiprocessor systems (for example, with a million or more processors).

There are various designs for indirect interconnection topologies. An indirect interconnection topology for a multiprocessor system can be considered as a graph with each processor as a-vertex (or node) and with an edge between two vertices if their corresponding processors are directly connected. The terms "graph" and "system" are used interchangeably throughout this application. In selecting a topology for a multiprocessor system, several factors are considered to optimize the design and maximize performance.

The first criterion is that the degree of a graph should be small. The degree of a graph is defined as the maximum number of vertices connected directly (through I/O ports) to a vertex in the graph. This restriction represents the fact that a processor with a large number of I/O line interfaces is expensive and may not be feasible for realization due to pin-out limitations, multiplexing problems, etc.

The second criterion is that the diameter of the graph should be small relative to the number of the vertices. The diameter of a graph is defined as the maximum shortest distance between any pair of vertices in the graph. Processing elements not directly connected will have to have messages relayed by intervening vertices. The number of relays in the worst case should be kept small to keep communication time delay between processors to a minimum.

Third, there should be no congestion parts in the system. The message relaying load should be uniformly distributed throughout the network such that there is no bottleneck in the message communication flow.

Fourth, the routing algorithm for any node in the system should be easily implemented, so that the cost of time for communication is small. Also, the system should be uniform so that each node processor could be loaded with the identical routing algorithm to forward messages independent of the location of the node in teh system. The node need only recognize its own address. Uniformity also creates a system without congestion.

Fifth, the system should be robust. For a large system with thousands or more processors, it is very possible that there are some processors which have faults. The faulted system with a number of faulted processors (nodes) should still be able to perform computation by disabling the faulty processors, reconfiguring the system (by the host or control processor) and by routing messages around the faulted notes. The robustness is very important for such a system. Usually the robustness of a system is related to the number of possible (or alternative) paths between each pair of processors.

Sixth, the system should have good emulation capabilities to emulate other network topologies.

Figures 1A, 1B, 1C, 1D, 1E, 1F:
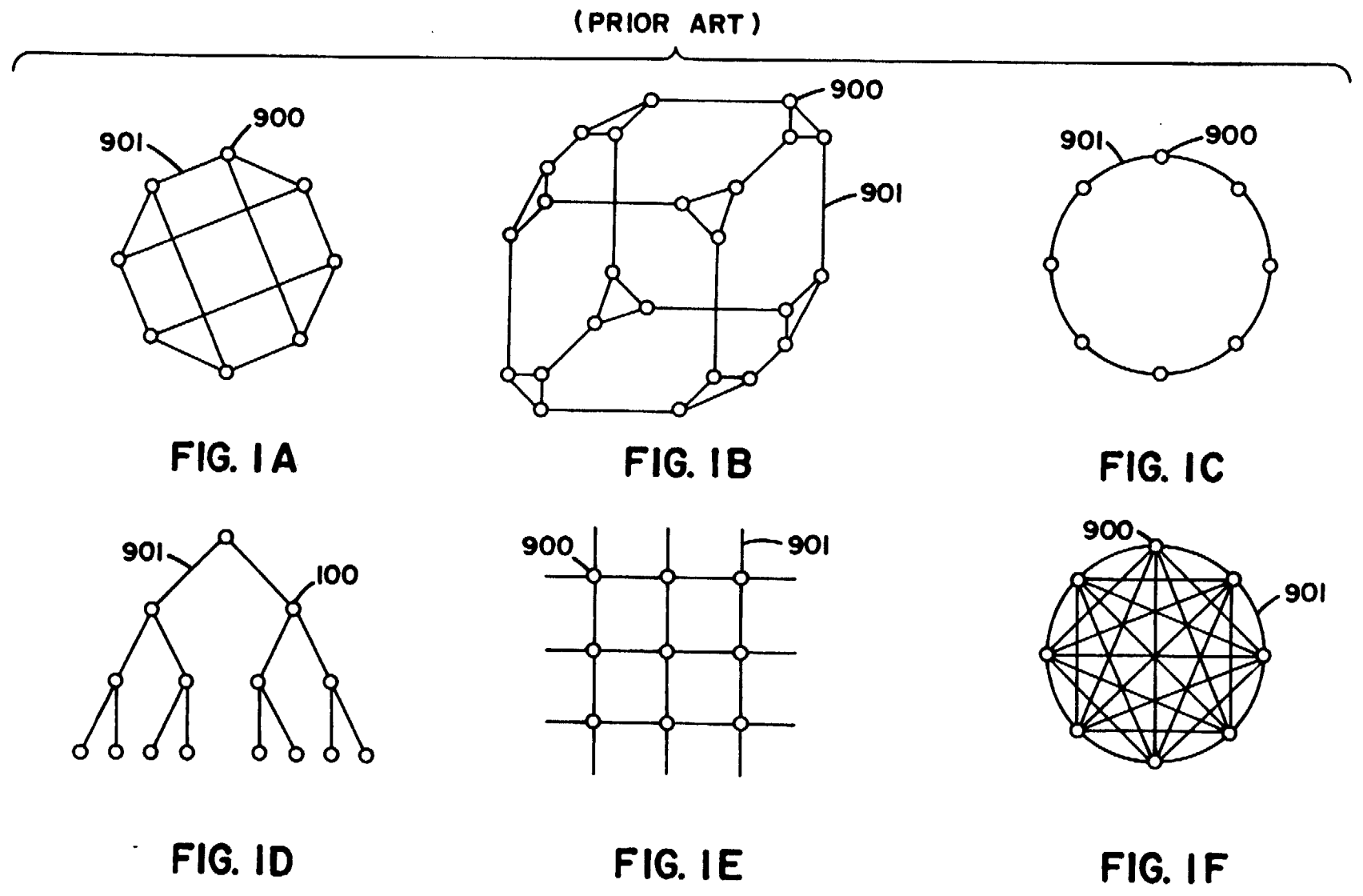

The extreme case of small degree (few I/O ports) is to allow each processor to have at most two or three neighbors. An example of a network topology with only two neighbors is the ring, as shown in FIG. 1C. The diameter of a ring is equal to half the number of vertices. In the ring shown in FIG. 1C, the diameter, therefore, is 4, as the number of vertices is equal to 8.

To allow the network topology a maximum of three neighbors to keep the degree small has been proposed in the prior art in the form of several different topologies for the family of trivalent graphs. One of these is shown as the tree structure in FIG. 1D in which each node is attached to one parent and two children. The tree topology results in congestion and poor robustness. Another example of a multiprocessor topology of small degree (4) is the mesh in which each processor has four neighbors to which it is attached. The diameter of the mesh structure is $\sqrt{N}$ is the number of nodes in the system)

and as the size grows very large, so too does the diameter, making the interprocessor communication through the large network extremely difficult.

The extreme case of small diameter is to allow each processor to be connected to every other processor in the network. This is exemplified in FIG. 1F as the completely connected topology. For a completely connected network where the number of processors in the system is N, the degree p is equal to n−1 and the diameter d is equal to 1. Thus, a completely connected topology offers extremely efficient communication between the processors but is limited in size due to the high number of I/O ports that each processor must support.

The cube-connected cycle shown in FIG. 1B is a trivalent graph with the number of processors $N = n2^n$ vertices when n equals the dimension of the cube. The vertices are grouped into $2^n$ cycles of n vertices each and conceptually arranged at the corners of an n-cube. Each of the n edges emanating from a corner of the cube is used to connect one of the vertices of the corresponding cycle to a vertex of a neighboring cycle. The diameter of the system is $5/2 \log_2 N + O(1)$. A generalization of the binary trees, called multitree structure graphs, is formed by taking t binary trees and connecting the root of each to one vertex of a t-vertex cycle. Its diameter is less than $2 \cdot \log_2 N + O(1)$. Another trivalent graph is the Dense Trivalent Group (DTG). Its diameter is $3/2 \cdot \log_2 N + O(1)$. This topology cannot simulate a two- or three-dimensional mesh.

Another type of trivalent graph is the chordal ring, shown in FIG. 1A. A comparison of a variety of the prior art network topologies is shown in TABLE 1. Formulas for calculating the diameter and degree of the network topologies are shown. Also shown are the other types of topologies that each topology can emulate. Comparative judgments based on the criteria such as robustness, congestion and uniformity of the structures discussed above is also included in TABLE 1.

zero-cube in which there is a single node with no connections to any other nodes.

Figure 2C:
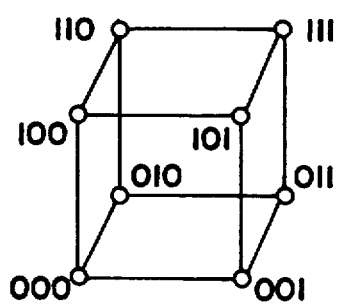
Figure 2D:
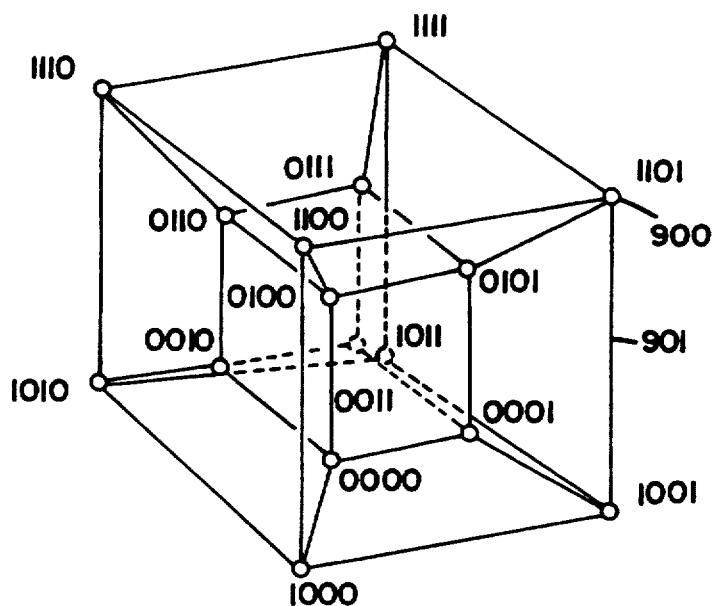

A 2-cube has the number of processors N equal to $2^n$ in which n is the dimension of the cube. Hence, the 2-cube has four processors shown with vertex addresses 00, 01, 11, and 10 in their binary form. A standard three-dimensional cube also shown in FIG. 2 is degree of 3, a diameter of 3, and has 8 processors or nodes connected by 12 communication paths. Each node in a 3-cube connects with three other nodes. In a general sense, the binary n-cube or hypercube has a diameter of $\log_2 N$ and a degree of $\log_2 N$. The hypercube can be extended into any number of dimensions for implementing a regular interprocessor communication network. For example, the 4-cube of FIG. 2 is a theoretical representation of a four-dimensional cube with the binary addresses of each node of the cube shown in FIG. 2. The diameter of a 4-cube is equal to 4 and its degree is 4 such that each node is connected to four other nodes in the system. Those skilled in the art can readily recognize the extension of the hypercube into n-dimensions.

The hypercube has received significant interest due to the success of the Caltech Cosmic Cube project, the commercial availability of the NCUBE/10 parallel processor, and the availability of boolean cube-configured concurrent processors from Intel Scientific Computers, NCUBE, Ametek, Floating Point Systems and Thinking Machine Corp. The reason why the binary hypercube has attracted so much attention is because of its powerful topological properties. That is, homogeneity, symmetry, ability to map most other popular network topologies and recursive structure. Many practical algorithms based on two- or three-dimensional meshes (grids), trees and rings (cycles) can be embedded into or emulated by the binary hypercube. For example, the commercially available binary hypercube parallel processor NCUBE/10 has a potential computing power of 500 million floating-point operations per

TABLE 1

| Name | Diameter | Degree | Congestion | Emulation | Robust | Uniform |
| --- | --- | --- | --- | --- | --- | --- |
| Hypercube (n-cube) | $\log_2 N$ | $\log_2 N$ | no | ring, mesh, tree | good | yes |
| Dense Trivalent Graph | $3/2 \log_2 N$ | 3 | some | tree, ring | fair | no |
| Cube-Connected Cycle | $5/2 \log_2 N$ | 3 | no | ring, mesh, tree | good | yes |
| Chord Ring | $\sqrt{N}$ | 3 | no | ring | fair | yes |
| Tree | $\log_2 N$ | 3 | very severe | tree | poor | no |
| Mesh | $\sqrt{N}$ | 4 | yes | mesh | not good | no |
| Ring | $\frac{1}{2} \cdot N$ | 2 | no | ring | poor | yes |
| Pyramid | $\frac{1}{2} \cdot \log_2 N$ | 8 | fair | mesh, ring, | good | no |
| Multitree | $2 \cdot \log_2 N$ | $\sqrt{N}$ | no | tree | not good | no |

FIG. 2 is an example of another type of interconnection topology termed the hypercube or n-cube. The hypercube takes its name from a three-dimensional cube extended into lesser and greater dimensions. For example, as shown in FIG. 2, a 1-cube is simply two nodes connected along a single communication path. Each node or vertex 900 is connected along an edge 901 of the cube which represents in graphical form a communication link. The simplest form of a hypercube is a second (MFLOPS) which is more than three times as much as that of a CRAY-1 computer. However, the relative cost of the NCUBE/10 is much less than that of the CRAY-1.

The NCUBE/10 parallel computer available from NCUBE Corporation of Beaverton, Oregon, is a true parallel processing computer which can be configured with as few as 16 processors and expanded to a maximum of 1,024 processors. The NCUBE/10 machine is implemented using a hypercube technology expandable to a degree of 10 with a diameter of 10. Each node within the system is an independent 32-bit microprocessor with its own local memory and, at the most, 10 communication links to other nodes or processors in the system. Each node in the NCUBE/10 device has one 32-bit microprocessor and 128 Kbytes of memory. Each node executes its own program out of its local memory and operates on its own data. Each node in the NCUBE/10 machine is connected in a network of a hypercube configuration to a set of its neighbor's through Direct memory Access (DMA) communication channels that are controlled by the microprocessor of the node. The initiation and execution of communication throughout the network is on an interrupt basis, allowing the microprocessors of each node to independently process data while communication through DMA channels continues. System configuration, global control and external I/O is controlled by host processors.

Twenty channels are connected to each node for communication with its neighbors in a fully configured NCUBE/10 machine. Ten in-bound and ten out-bound channels run at 10 Mbits per second. An additional in-bound and out-bound channel are used for system I/O and various control functions within the machine. Each node is embedded with a routing algorithm which allows it to communicate with any other node or to pass communications through its node to be forwarded to the addressed node.

Another prior art multiprocessor using an n-cube interconnection network topology is the Connection Machine constructed at Thinking Machines Corporation, Cambridge, Mass. The prototype of this machine, the CM-1, contains 65,536 ($2^{16}$) cells or processors connected by packet-switched network based on the boolean n-cube (hypercube) topology and using an adaptive routing algorithm. The network topology is constructed using a 12-cube where each node in the 12-cube is constructed of a router processor connected to 12 other remote router processors and also connected to 16 local microprocessors. Each node in the 12-cube of the CM-1 is constructed from a custom designed VLSI chip that contains 16 processor cells and one router unit of the packet-switched communications network. All communications transfers through the 12-cube take place over the edges of the 12-cubes connected to bidirectional I/O pins on each VLSI processor and router chip.

Each vertex in the 12-cube of the CM-1 multiprocessor has 16 processors connected in a 4×4 grid (mesh) such that each processor at each vertex communicates directly with its north, east, west and south neighbors within the same vertex. Thus, each vertex in the 12-cube of the CM-1 multiprocessor is substituted with a two-dimensional mesh topology which connects to the 12-cube through a router.

Parallel processing computers of the size and type of the NCUBE/10 and the CM-1 are used for a wide variety of scientific applications such as seismic processing, image processing, artificial intelligence processing, simulation of events such as fluid flow, molecular modeling, weather, and many other applications. The common purpose in all of these applications is to solve a problem as a set of concurrent cooperating subtasks. As requirements for these applications grow in the future, higher performance with larger numbers of processors is required to effectively meet the needs of the scientific community.

However, as mentioned above, it is very difficult to build a hypercube with massive number of processors using today's VLSI technology, since the degree of a processor in a hypercube is of $\log_2 N$. For instance, in the NCUBE/10 parallel processor there are 1024 processors (a 10-cube) in a fully configured, 16-board machine. Each board contains 64 processors (a 6-cube) with 8 Mbytes of memory. Since each processor on the board has off-board bidirectional I/O channels to four more processors and one bidirectional I/O channel to one I/O board (the six remaining I/O channels communicate with on-board processors), this results in 512 backplane connections just for communication channels for one board. If a multiprocessor system of about one million ($2^{20}$) processors is to be realized based on the same technology, 1792 backplane connections for one board are required (assuming each node can support 20 I/O ports). This makes the hypercube topology unrealistic for a multiprocessor of one million processors. As the Very Large Scale Integration (VLSI) technology improves to the Ultra Large Scale Integration (ULSI) technology, the number of processors which can be packed into a chip or a board increases. Thus, it is important to use a topology of small degree (fewer I/O) to minimize the number of inter-chip or inter-board I/O connections. However, the diameter of a topology of a small degree tends to be big and the robustness of the topology tends to be reduced. Most of the previously discussed prior art topologies other than the hypercube are of degree 3 or 2. For a multiprocessor of medium or large size, a topology of a degree greater than 3 will be needed, but with a small diameter and improved robustness.

DETAILED DESCRIPTION OF THE PREFERRED EMBODIMENTS

In the following detailed description of the preferred embodiments, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural changes may be made without departing from the scope of the present invention. The following detailed description is, therefore, not to be taken in a limiting sense, and the scope of the present invention is defined by the appended claims.

The objective of the new class of interconnection topologies which form the preferred embodiments of the present invention is to reduce the degree and the diameter of the hypercube while preserving the favorable topological properties so that very large parallel processors can be constructed and operated. The first class of topologies discussed below is an improved hypercube termed the *Modified Hypercube* (MH). This unique topology reduces the diameter of a hypercube by approximately ½ at the expense of increasing the degree by 1. In some applications this is a favorable trade-off. A second type of interconnection topology is proposed which is based upon the Modified Hypercube and termed the *Substituted and Modified Hypercube* (SMH). Several examples of the SMH topologies are presented below, and the MH and SMH topologies are described both in textual form and in mathematical notation with reference to the attached drawings.

The degree of an SMH can range from 3 to $\log_2 N$ or more. The diameter of an SMH is reduced compared with existing topologies of the same degree. For instance, there are $N=(n+1)\cdot 2^n$ nodes in one SMH topology discussed below, and the degree and the diameter are 3 and $2\cdot\log_2 N + O(1)$ respectively. This compares favorably with the similar cube-connected cycles which has a degree of 3 and a diameter of $5/2\ \log_2 N + O(1)$.

In the detailed discussions which follow, the three most important topological properties of an interconnection network are discussed, which are: 1) the total number of nodes N in the system; 2) the degree p of the system; and 3) the diameter d of the system. In keeping with the structure of this discussion, the following notation is used.

Substitution Topology Terminology

The topological properties PROP(S) of a multiprocessor system S is denoted by a three-tuple (N,p,d), where N is the total number of processors in S, p is the degree of the topology, and d is the diameter of S.

Let $S_1$ denote a topology of a first multiprocessor system with $PROP(S_1)=(N_1,p_1,d_1)$ and $S_2$ denote another topology of a second multiprocessor system with $PROP(S_2)=(N_2, p_2, d_2)$. A new topology called Substituted Topology $ST(_2, S_1)$ can be formed by replacing each vertex in $S_2$ by a $S_1$. $S_2$ is called the basic topology and $S_1$ is called the block topology. Since each vertex in $S_2$ has a degree of $p_2$ (number of I/O ports per vertex), we need to decide how these $p_2$ edges are connected to the vertices in $S_1$. Assume first that $p_2$ edges are connected uniformly to the vertices in $S_1$ for the time being. That is, there are at most $\lceil p_2 N_1 \rceil$ "extra" edges connected to each vertex in a $S_1$ after the substituting.

Let $PROP(ST(S_2, S_1))=(N,p,d)$. Then the following three equations are true.

In the first equation, $$N = N_1 \cdot N_2,$$

where the total number of nodes in the Substituted Topology N is equal to the number of nodes in the basic topology $N_2$ times the number of nodes in a single block topology. Since each $S_1$ has $N_1$ vertices and $S_2$ has $N_2$ vertices, after each vertex in $S_2$ replaced by a $S_1$, $ST(S_2, S_1)$ has $N_1 \cdot N_2$ vertices. For example, every vertex in $S_2$ is replaced by the block topology $S_1$, each of which having $N_1$ nodes. The resulting Substituted Topology has $N_1$ times $N_2$ nodes.

For the second equation, $$p = p_1 + \lceil p_2/N_1 \rceil$$

where each vertex in the basic topology $S_1$ is connected to $P_1$ other vertices. After the substitution, $\lceil p_2/N_1 \rceil$ extra edges are added to it. (The half-bracket notation used here refers to the mathematic function of taking the integer quantity of a real or fractional number.)

For the third equation, $$d \leq (d_2 + 1) \cdot d_1,$$

the diameter of the Substituted Topology $d_1$ is a function of the diameter of the block topology $d_1$, multiplied by the diameter of the basic topology, first incremented by one. Since the diameter of the basic topology $S_2$ is $d_2$, the longest path between two vertices consists of $d_2$ edges and $d_2 + 1$ vertices. After each vertex in the basic topology $S_2$ is replaced by a block topology $S_1$, the longest possible path between two vertices in $ST(S_2, S_1)$ is no more than $(d_2 + 1) \cdot d_1$.

In comparing $ST(S_2, S_1)$ with the original basic topology $S_2$, the Substituted Topology $ST(S_2, S_1)$ contains many more vertices (many more processors). Since $p_1 < p_2$ and $N_1 > 2$, the degree of $ST(S_2, S_1)$ (i.e., $p_1 + p_2/N_1$) can be smaller than the number of ports $p_2$ if $p_1$ is much smaller than $p_2$. Although the diameter of $ST(S_2, S_1)$ can be potentially much bigger than $d_2$, it is actually quite small when the details of the topology $S_1$ are considered along with the below-described routing algorithm. Several examples of this are discussed below.

This substituted topology still preserves some topological properties from both $S_1$ and $S_2$. For instance, a routing algorithm can be easily developed based on the routing algorithms for $S_1$ and $S_2$. In order to demonstrate this let us further assume that the address of a vertex in $ST(S_2, S_1)$ is denoted by a two-tuple (inter-address, inner-address). Inter-address is the address of a vertex in the basic topology $S_2$ which has been replaced by a block topology $S_1$ in $ST(S_2, S_1)$. Inner-address is the address of a vertex in the particular block topology $S_1$. A path between two vertices (x,y) and (x',y'), where x, x' are inter-addresses and y, y' are inner-addresses, can be routinely derived as shown in FIG. 3.

Figure 3:
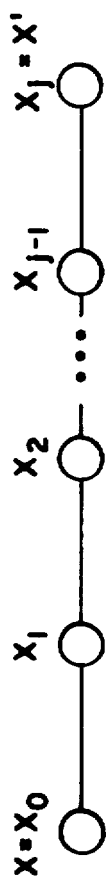
FIG. 3 shows a path connecting x and x' in the basic topology $S_2$.
Figure 4:
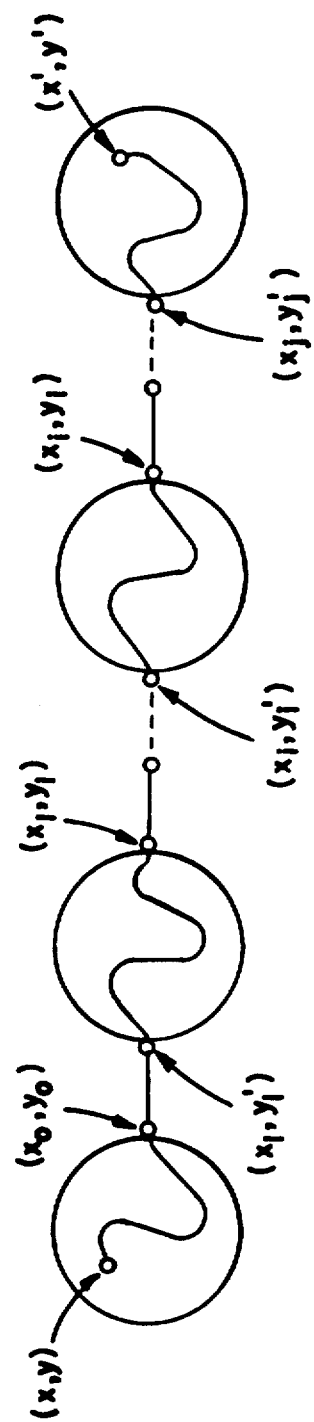
FIG. 4 shows a path connecting (x, y) and (x', y') in a Substituted Topology $ST(S_2,S_1)$.

First consider two vertices with addresses x and x' in $S_2$, shown in FIG. 3. There exists a path $x = x_0, x_1, x_2, \ldots, x_{j-1}, x_j = x'$ connecting x and x' in $S_2$. For the Substituted Topology shown in FIG. 4, each vertex $x_1$ in $S_2$ is replaced by a $S_1$ in $ST(S_2, S_1)$ Since the longest distance between any two vertices in $S_2$ is $d_2$ and the longest distance between any two vertices in $S_1$ is $d_1$, the longest possible distance between any two vertices in $ST(S_2, S_1)$ is no more than $d (d_2 + 1)$.

Modified Hypercube

The above substituting scheme can be applied to any two topologies. The preferred embodiment of the present invention uses hypercube as the basic topology and to combine hypercube with various other block topologies to achieve our goal. However, as discussed above, the substituting scheme may increase the diameter of the resulting topology. Therefore, the preferred embodiments of the present invention use a modified hypercube as the basic topology to reduce the diameter of the resulting topology. To aid in the description of the modified hypercube topology, a set of cubic functions and a complement function are described below.

First, let $i = [i_{n-1} i_{n-2} \ldots i_j i_0]$ be the binary representation of an integer i (where n is the number of binary bits) and for a single bit x, let $\bar{x} = 1 - x$, then 1) A cubic function, $\beta_j$ for $0 \leq j \leq n-1$, is defined by $$\beta_j(i) = [i_{n-1} \ldots \bar{i}_{j+1} i j_{j-1} \ldots i_0],$$

2) A complement function, $\gamma$, is defined by $$\gamma(i) = [\bar{i}_{n-1} \bar{i}_{n-2} \ldots \bar{i}_{j+1} i \bar{j}_{j-1} \ldots \bar{i}_0]$$

A vertex i ($0 \leq i \leq 2^n - 1$) is connected to n other vertices $\beta_0(i), \beta_1(i), \ldots, \beta_{n-1}(i)$ in a hypercube topology. In the Modified Hypercube topology each vertex i is also connected to vertex $\gamma(i)$. That is, each node having an address i in a Modified Hypercube is additionally connected to a node having a complement address $\gamma(i)$. The addition of one more connection (port) to each node increases the degree of the hypercube by one. While the degree of the Modified Hypercube is increased by one, the diameter of the system is reduced to approximately half of the original. This property of the Modified Hypercube will result in very good substituted topologies as described below. The Modified Hypercube of $2^n$ vertices is denoted by $MH_2$ for purposes of the present patent application. $PROP(MH_n) = (2^n, n+1, \lceil n/2 \rceil)$. This Modified Hypercube has several advantages discussed below.

Figure 5:
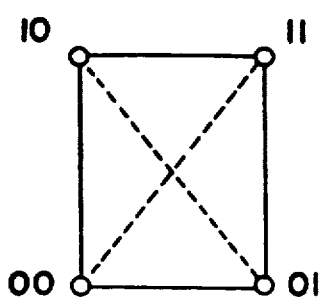
FIG. 5 is a Modified Hypercube $MH_2$ formed from a 2-cube.

FIG. 5 shows a simple example of a 2-cube in its Modified Hypercube form $MH_2$. The edges of the original 2-cube are shown in solid lines, while the additional edges of the Modified Hypercube are shown in dashed lines. The vertex with binary address 00 is directly connected by the additional edge to the vertex having a binary address of 11. In a like fashion, the vertex with the binary address 10 is connected by a new edge to the vertex having a binary address 01. Thus the new edges in the Modified Hypercube connect vertices with complementary binary addresses. For $MH_2$, the resulting topology is the same as a completely connected network.

Figure 6:
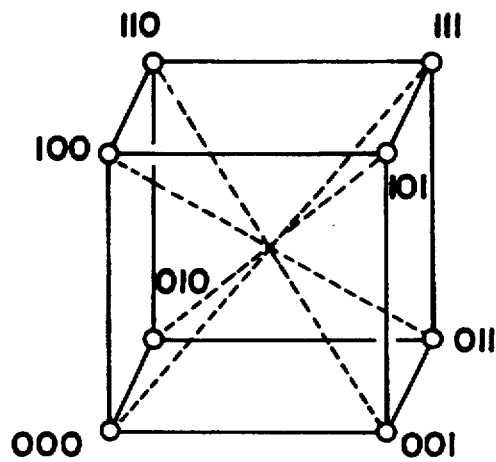
FIG. 6 is a Modified Hypercube $MH_3$ formed from a 3-cube.

FIG. 6 shows a 3-cube modified according to the teachings of the present invention to be a Modified Hypercube $MH_3$. Each vertex in $MH_3$ has a 3-bit binary address and the edges of the original 3-cube are shown in solid black lines. The dashed lines show the additional edges in the $MH_3$ which connect the vertices having complementary binary addresses.

For the $MH_3$ shown in FIG. 6, there are 8 nodes or vertices and each is of degree 4. That is, each processor node has four I/O ports. It is easy to see that the diameter of $MH_3$ is 2. Compared with n-cube, the $MH_2$ is more robust. For instance, there are four virtual 3-cubes in a $MH_3$ as shown in FIG. 7 with the node address shown in decimal form for convenience. When processor nodes 3 and 4 are faulty in a 3-cube, it can be seen that there exist no "good" 2-cubes. The entire multiprocessor system would be disabled for 2-cubes. However, as shown in FIG. 7, there still exist three 2-cubes (i.e., the 2-cubes formed by nodes [2,5,1,6] or by nodes [0,7,5,2] or by nodes [7,0,1,6] in a $MH_3$. In general, for $MH_2$ systems with for example two failures, there remain a plurality of (n-1)-cubes to carry on processing. Hence the system is very fault tolerant. The additional communication established in a Modified Hypercube also provides a greater number of communication paths which tend to reduce interprocessor communication delay within the system.

The Modified Hypercube topology can be extended to n-dimensional hypercubes to reduce the diameter by approximately one-half at the cost of increasing the degree by 1. This has significant advantages to multiprocessor computers in and by itself for improving robustness and communicability within the system. Those skilled in the art will readily recognize the performance improvements in a multiprocessor design where messages between multiprocessors can be more expeditiously forwarded to reduce the communication bottleneck inherent in such designs. The application of the Modified Hypercube topology to such prior art multiprocessors such as the NCUBE/10 machine will be readily apparent for increasing the speed of communication throughout the machine at the expense of reducing its degree. Thus, an NCUBE/10 processor, being limited to 10 interprocessor I/O ports, would contain 512 processors in a 9-cube with a degree of 10 but a diameter of 5. Such a trade-off is extremely advantageous in computing applications where speed between interprocessors is primary.

The properties of the Modified Hypercube $MH_n$ can be compared to the prior art topologies of Table 1 in that the diameter d is equal to and $\lceil \frac{1}{2} \cdot [\log_2 N + 1] \rceil$ and the degree is equal to $\log_2 N + 1$. The Modified Hypercube is a completely symmetric system and has the same ability to emulate most popular networks such as the ring, mesh and tree topologies as the hypercube as well as having the ability to emulate the standard hypercube. The Modified Hypercube is very good in terms of its robustness and of course is uniform in its topology, lending itself to a simple routing algorithm.

Substituted and Modified Hypercube

Applying the substituting scheme to the Modified Hypercube, a Substituted and Modified Hypercube (SMH) can be obtained according to the teachings of the present invention. Assume as above that $PROP(S_1) = (N_1, p_1, d_1)$, and denote the Substituted Topology $ST(MH_n, S_1)$ by $SMH_n(S_1)$ since the basic topology $S_2$ is a Modified Hypercube $MH_2$. In compliance with the substitution terminology discussed above, each vertex or vertex address in $SMH_n(S_1)$ is denoted by a two-tuple $(x,y)$, where $0 \leq x < 2^n$ and $0 > y < N_1$. Note that there are $N_1 \cdot 2^n$ vertices in $SMH_n(S_1)$. The x value of the two-tuple represents the vertex address location in the basic topology $S_2$ (which is $MH_n$) and the y value of the two-tuple represents the vertex address location within the block topology $S_1$ (which has been inserted into the basic topology at each $S_2$ vertex).

For purposes of the description given here, it is defined that two vertices $(x,y)$ and $(x',y')$ belong to the same block (block x) if and only if $x = x'$. That is, the two vertices are found within the same block topology $S_1$ when the x value of the address two-tuples match. Thus, each block (original $S_2$ vertex) contains $N_1$ vertices Thus block x is adjacent to block $x'$ if and only if either $x' = \beta_j(x)$ for $0 \leq j < n$ or $x' = \gamma(x)$. Without knowing the details of the block topology $S_1$, the connections between vertices in $SMH_n(S_1)$ are described as follows. First, vertices in the same block (same original $S_2$ vertex location) are connected according to the topology of the block topology $S_1$. That is, two vertices $(x,y)$ and $(x,y')$ are connected directly if and only if vertex y is connected directly to vertex $y'$ in $S_1$. The discussion of how a vertex is connected to vertices in adjacent blocks is given below. When $n+1 < N_1$, there is only a subset of vertices in a block connected to the vertices in other adjacent blocks. That is, there are more vertices in the block topology $S_1$ than there are required connections to the basic topology $S_2$ ($MH_n$) so that some I/O ports of the $S_1$ vertices are left unused (assuming homogeneous processors with a fixed number of I/O ports set to the maximum degree of the system). Assume that we choose $n+1$ vertices to connect to other adjacent blocks. That is, vertex $(x,y)$ is connected directly to vertex $(\beta_y(x), y)$, if $0 \leq y < n$, the cubic function of the X value being used to assign the connecting address node location in the Substituted Topology. Vertex $(x,n)$, the last remaining vertex to be connected in the block topology $S_1$, is connected directly to vertex $(\gamma(x), n)$, the complement function of the x value being used to assign the connecting address node location in the Substituted Topology. This is in keeping with the earlier discussed concept of using the additional edges in a Modified Hypercube to connect complement binary addresses of nodes to reduce the diameter and to facilitate the simplicity of the routing algorithm. Thus, from the foregoing discussion, the degree of $SMH_2(S_1)$ is $p_1 + 1$.

When $n + 1 \geq N_1$, vertex (x,y) is connected directly to vertices $(\beta_j(x),y)$, where $0 \leq j < n$ and $y = j$ mod $N_1$, and vertex (x,y) is also connected to vertex $(\gamma(x),y)$ if $y = n$ mod $N_1$. In this example, there are more required connections from the block topology $S_1$ to the basic topology $S_2$ ($MH_n$) so some of all of the nodes of $S_1$ must connect to more than one edge in $S_2$. The degree of $SMH_n(S_1)$ is $p_1 + \lceil n + 1/n_1 \rceil$ and the diameter of a $SMH_n(S_1)$ can be quite small.

For purposes of illustrating the flexibility of the preferred embodiment of the present invention, a cycle-connected topology (i.e., a ring) with properties $PROP(S_1) = (N_1, 2, \lceil N_1/2 \rceil)$ is denoted as $C_{N1}$ and used as $S_1$ for $SMH_n(S_1)$ In $CN_1$ vertex i for $0 \leq i < N_1$ is connected to vertex $(i + 1)$ mod $N_1$ (modulus function for base 2). Then the diameter of $SMH_n(CN_1)$ is more than $\lceil 3 \cdot N_1/2 \rceil + \lceil n/2 \rceil$. Thus, the Substituted and Modified Hypercube topology will support a wide variety of topologies for the block topology $S_1$.

Figure 8:
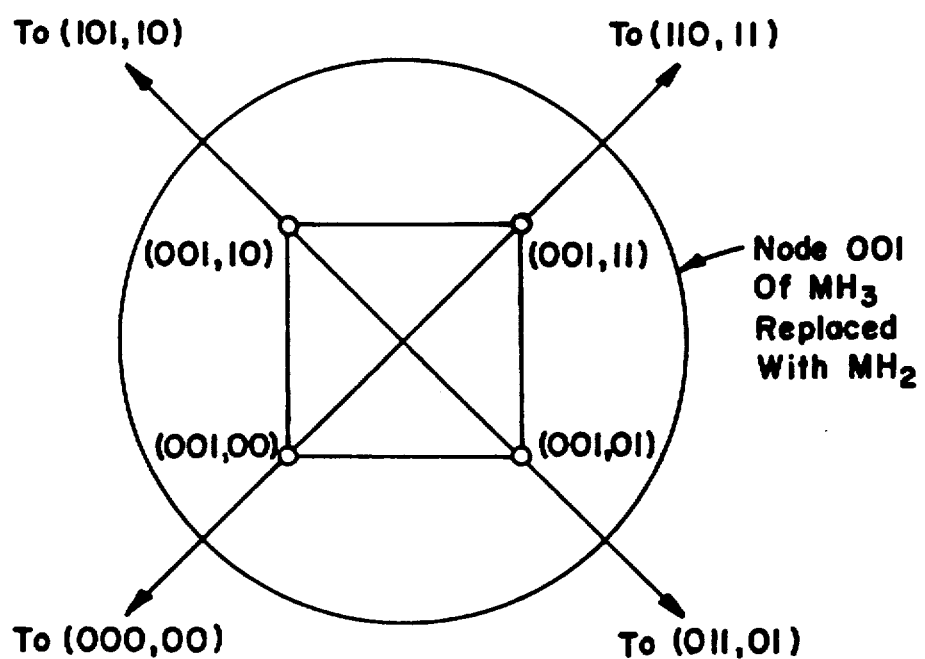
FIG. 8 shows a substituted node of a Substituted Topology $MH_3$ ($MH_2$) where the basic topology is a Modified Hypercube of the type shown in FIG. 6 and the block topology is a Modified Hypercube of the type shown in FIG. 5.
Figure 7A:
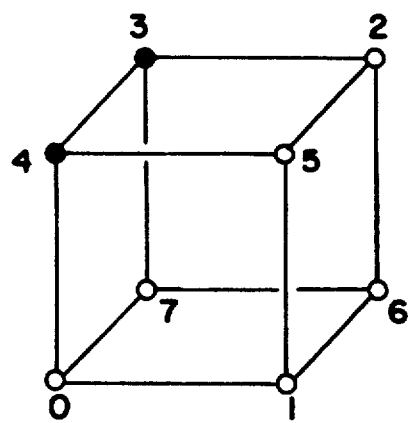
FIG. 7A, 7B, 7C, 7D exemplifies the robustness of the Modified Hypercube by showing four remaining virtual 2-cubes in a $MH_3$ configuration when nodes 3 and 4 are faulty.
Figure 7B:
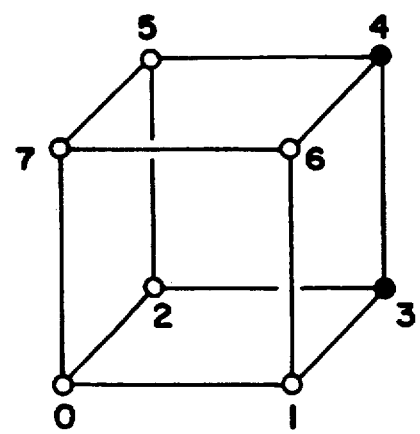
Figure 7C:
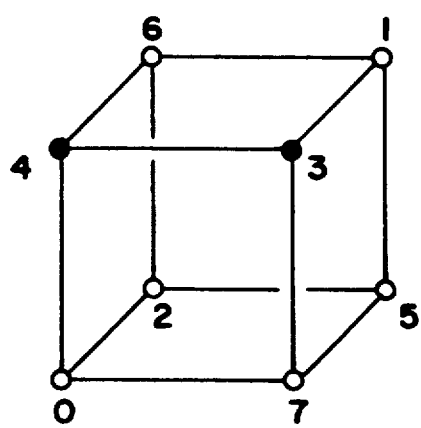
Figure 7D:
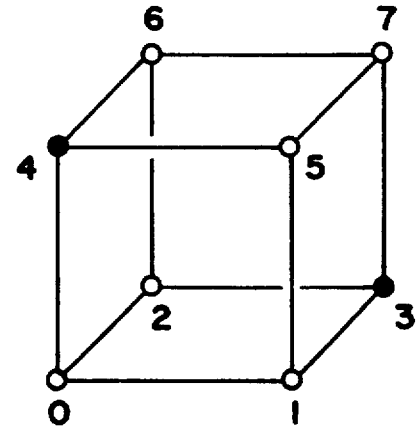

Another example of an efficient block topology $S_1$ for the $SMH_n(S_1)$ Substituted Topology would be to use a Modified Hypercube of lesser degree for the vertices of the Modified Hypercube basic topology. An example of this topology is shown in FIG. 8. For a basic topology $MH_3$ shown in FIG. 6, each vertex of $MH_3$ is substituted by a Modified Hypercube of degree 2 to create $SMH_3(S_1)$ where $S_1 = MH_2$. The resulting substituted topology results in 32 processors (N = 32), a of 4, and a degree of 4.

Figure 9:
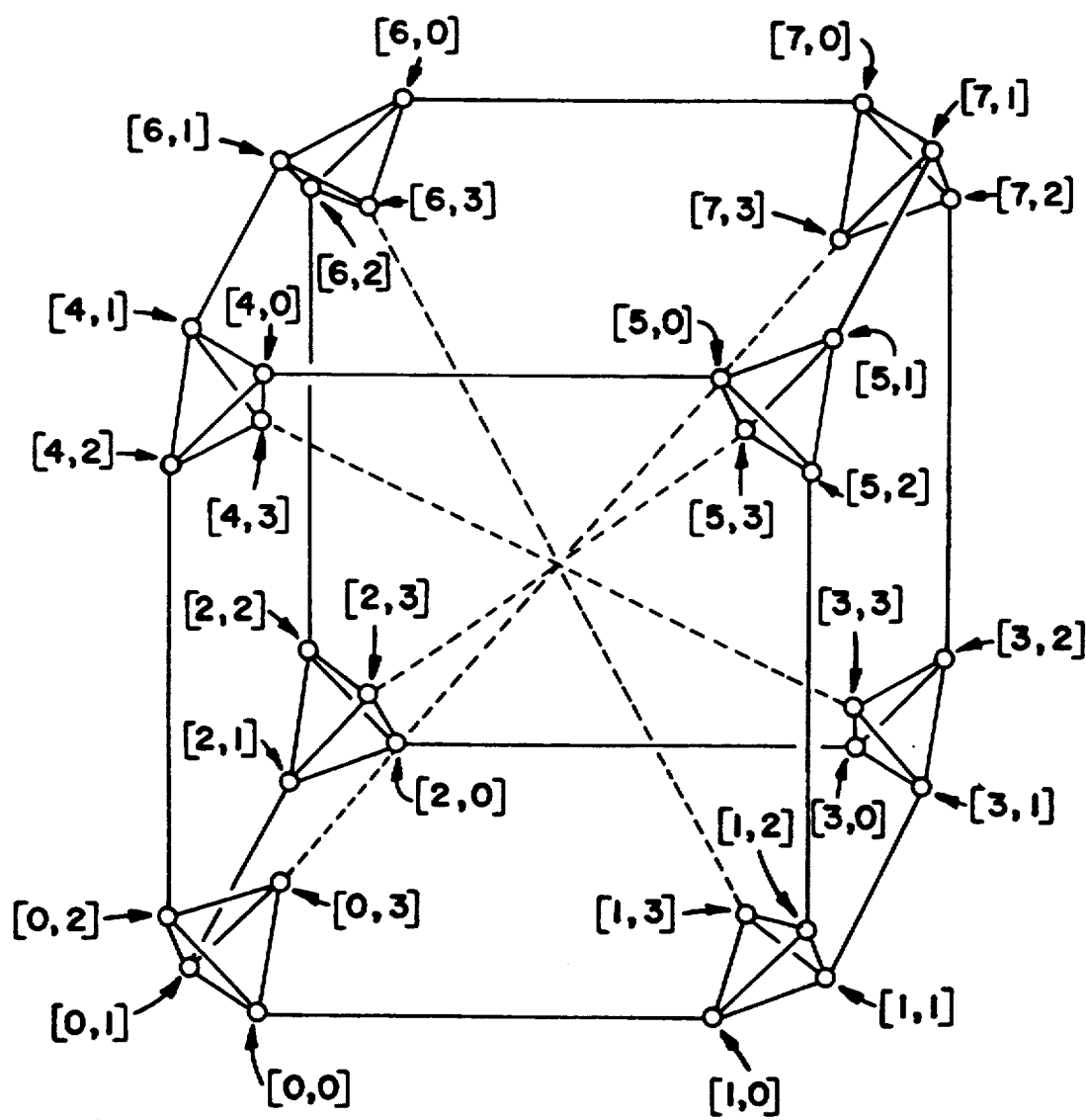
FIG. 9 is a graphical representation of a Substituted Modified Hypercube $SMH_3$ ($MH_2$) where the basic topology is a Modified Hypercube of the type shown in FIG. 6 and the block topology is a Modified Hypercube of the type shown in FIG. 5.

FIG. 9 shows the resulting Substituted and Modified Hypercube of degree 15, the diameter is 8, the degree is 16, and the number of nodes remains the same. In the present example, a Substituted and Modified Hypercube $SMH_{15}(C_4)$ has 131,072 nodes with a degree of 6 and a diameter of 13. Since the block topology $S_1$ only contains four nodes and each vertex of the $MH_{15}$ has a degree of 16 requiring each block to have 16 I/O lines, the mapping of the nodes of the block topology onto the basic topology is not a simple 1-to-1 correspondence. Each node within the block topology therefore must map onto four nodes in the basic topology. Since the four nodes within the block topology $S_1$ already have connections to two other nodes, four additional connections are required of each node to connect the nodes of the block topology to the edges of the basic topology. Thus, the degree of the system is equal to 6.

The $S_1$ block topology must be a cycle-connected topology. A requirement for a cycle-connected topology is that there must be a path passing through all of the nodes only once. Examples of cycle-connected topologies that can be used as $S_1$ in the present invention are the ring, any hypercube including the Modified Hypercube, any full connection topology, etc. An example of a topology which is not a cycle-connected topology and cannot be used as a block topology for the present invention is the tree structure.

Table 2 lists the diameter and ports for the $SMH_n(S_1)$ topologies where several $S_2$ topologies are listed. Table 2 clearly shows the advantages of the Substituted and Modified Hypercube topologies of the preferred embodiment of the present invention. The diameter and degree of each of the Substituted Topologies can be calculated from the general formulas given below.

TABLE 2

| | | Diameter and Ports for $SMH_n(S_1)$ | | | | | | | | | | | | | | | | |
|---|---|---|---|---|---|---|---|---|---|---|---|---|---|---|---|---|---|---|
| | $\log_2 N =$ | 4 | 5 | 6 | 7 | 8 | 9 | 10 | 11 | 12 | 13 | 14 | 15 | 16 | 17 | 18 | 19 | 20 |
| $SMH_n(H_1)$ | p = | 3 | 4 | 4 | 5 | 5 | 6 | 6 | 7 | 7 | 8 | 8 | 9 | 9 | 10 | 10 | 11 | 11 |
| | d = | 4 | 4 | 5 | 5 | 6 | 6 | 7 | 7 | 8 | 8 | 9 | 9 | 10 | 10 | 11 | 11 | 12 |
| $SMH_n(MH_2)$ | p = | * | 4 | 5 | 5 | 5 | 5 | 6 | 6 | 6 | 6 | 7 | 7 | 7 | 7 | 8 | 8 | 8 |
| | d = | * | 5 | 6 | 7 | 7 | 8 | 8 | 9 | 9 | 10 | 10 | 11 | 11 | 12 | 12 | 13 | 13 |
| $SMH_n(C_4)$ | p = | 3 | 3 | 4 | 4 | 4 | 4 | 5 | 5 | 5 | 5 | 6 | 6 | 6 | 6 | 7 | 7 | 7 |
| | d = | 6 | 7 | 7 | 8 | 8 | 9 | 9 | 10 | 10 | 11 | 11 | 12 | 12 | 13 | 13 | 14 | 14 |

$H_1$ is a 1-dimensional hypercube
$MH_2$ is a 2-dimensional Modified Hypercube
$C_4$ is a 4-node ring
*topology not possible Hypercube $SMH_3(MH_2)$ as the new substituted topology with $S_2 = MH_3$ and $S_1 = MH_2$. Each node within $SMH_3$ of FIG. 9 addressed using a binary two-tuple. The address tuples shown in FIG. 9 use decimal numbers for brevity. As previously discussed, each vertex of $MH_3$ has been replaced by $MH_2$ such that each $MH_2$ is a class of nodes having the same inter-address. For example, the vertices that belong to the same class x = 7 are [7,0], [7,1], [7,2], and [7,3]. This $MH_2$ topology individually has a diameter $d_1$ equal to 1 and a degree $p_1$ equal to 3.

To give another example of the flexibility of the $SMH_n$ algorithm, let n = 15 for $S_2$ and let $S_1$ be a loop (cycle) of four nodes with addresses 0,1,2,3 decimal (or 00, 01, 10, 11 binary). The binary addresses of each node in the $SMH_{15}(C_4)$ topology are comprised of a two-tuple with the inter-address x being a 15-bit binary address ranging from $x_0$ through $x_{14}$ and the inner-address being a 2-bit binary address y ranging from $y_0$ through $y_1$. In a standard hypercube of degree 15, the diameter of the hypercube is 15, the degree of the hypercube is 15, and the number of nodes N equal 32,768. In a Modi- As another example of the $SMH_2$ topology, consider $SMH_{12}(C_8)$ where $SMH_{15}$ is a Substituted and Modified Hypercube $S_2$ of degree 16 and $C_8$ is an 8-node $S_1$ cycle of degree 2 and diameter 4. There are $2^{18}$ processors in $SMH_{15}(C_8)$. The degree and the diameter of $SMH_{15}(C_8)$ are 4 and 20 respectively. In general, when the number of nodes in the cycle-connected topology increases the degree of the resulting topology decreases and the diameter of the resulting topology increases. On the other hand, if the number of nodes in the cycle-connected topology decreases, the degree of the resulting topology increases and its diameter decreases. For instance, the degree and the diameter of $SMH_{15}(C_{32})$ are 3 and 32 respectively. The degree and the diameter of $SMH_{15}(C_4)$ are 6 and 14 respectively. Thus, depending upon the demands of the application for the multiprocessor system, the topology can be selected accordingly.

The mapping of the nodes of the block topology onto the edges of the basic topology is a matter of choice and is not limited to a specific algorithm. However, by keeping the mapping orderly, the routing algorithm for transferring messages throughout the multiprocessor system will be simplified. An example of mapping in this illustration would be to start with a node in the block topology having address 00 and being mapped onto four edges of the basic topology. The addresses of the nodes outside the block onto which the present node is mapped would be $(\overline{X}_0, X_1, X_2, X_3, \ldots, X_{14}, 00)$, $(X_0, X_1, X_2, X_3, \overline{X}_4, X_5, \ldots, X_{14}, 00)$, $(X_0 \ldots X_7, \overline{X}_8, X_9, \ldots, X_{14}, 00)$, and $(X_0, \ldots, X_{11}, \overline{X}_{12}, X_{13}, X_{14}, 00)$. The foregoing mapping of nodes within the block topology onto edges in the basic topology is not a unique way of assigning the connections. Those skilled in the art will readily recognize a wide variety of mappings.

Note that the mapping of the node address 00 within the block topology connects to the nodes within other block topologies also having a local address of 00. This can also be seen in the SMH$_3$ of FIG. 5. This mapping technique is also used to facilitate the routing algorithm and does not necessarily have to be adhered to in mapping one block topology onto another block topology through the edges of the basic topology.

Those skilled in the art will readily recognize the wide variety of block topologies which can be used in combination with the Modified Hypercube MH$_n$ to provide new topologies of reduced diameter and degree. The examples given here using a Modified Hypercube as the block topology on SMH$_n$(S$_1$) are for illustration purposes only and are not intended to be limiting in the scope of the present invention. Those skilled in the art will readily recognize the extension of the SMH$_2$ topology to very large structures and the block topology used to create the Substituted Topology can likewise be very large. Although the applicants of the present invention have described one of the preferred embodiment of the present invention to be a Substituted Modified Hypercube with the block topology also being a Modified Hypercube or a cycle-connected topology, various design decisions will determine the decision as to the actual topologies substituted based on, for example, fixing the degree or fixing the diameter desired in the resulting system to tailor the multiprocessor system to its preferred application.

Comparing the Substituted and Modified Hypercube topology SMH$_n$(S$_1$) to the prior art topology shown in Table 1, the diameter of SMH$_n$ is $d = \lfloor n/2 \rfloor + \lceil 3 \cdot N_1/2 \rceil$. The degree (number of ports) is $p = p_1 + \lceil (n+1)/N_1 \rceil$. There is no congestion in the Substituted and Modified Hypercube in that the message or information distribution is facilitated by the Modified Hypercube for the basic topology. The SMH$_n$ topology is able to emulate the ring, mesh, tree, n-cube and cube-connected cycle topologies of the prior art. Its robustness is similar to the Modified Hypercube topology due to the additional interconnection paths, and hence it is very good. And similar to the hypercube and Modified Hypercube, the Substituted and Modified Hypercube is very uniform in its structure, lending itself to a standardized routing algorithm.

In comparing the prior art topologies with the Modified Hypercube and the Substituted and Modified Hypercube, it is clear that the Substituted and Modified Hypercube is clearly superior to all the prior art multiprocessor topologies for very large multiprocessor systems. It gains efficiency as the number of processors N grows.

Routing Algorithm for SMH$_n$

The routing algorithm for the Modified Hypercube takes advantage of the fact that direct connections are made within the hypercube structure between complemented node addresses and as many inter-block transfers are used as possible to shorten the diameter. This serves to reduce the overall diameter of the MH$_n$ approximately one-half, since the additional edges tend to reduce the worst-case minimum distances between any two nodes. In effect, the routing algorithm can use the additional edges as a "shortcut" to find the shortest path between nodes. The routing algorithm for Substituted and Modified Hypercube takes advantage of the regularity inherent in hypercube topologies in that each node can be programmed with a similar routing algorithm, different only in the embedded address of the resident node. The routing algorithm then uses the resident node address to calculate which I/O port to forward the message to if the message is not destined for the resident node. The following routing algorithm takes advantage of the SMH$_n$(S$_1$) topology to find the minimum distance between any two nodes. This algorithm is described in detail and in general mathematical terms to show the applicability of the routing algorithm to SMH$_n$(S$_1$) topologies where the block topology S$_1$ can be any number of a wide variety of topologies.

Consider any pair of nodes (x,y) and (x',y') in SMH$_n$(S$_1$). The worst-case minimum distance between any two nodes x and x' in a Modified Hypercube MH$_n$ is $\lfloor n/2 \rfloor$. This is due to the fact that if the Hamming distance between x and x' is greater than $\lfloor n/2 \rfloor$, then x can first be connected to the complement $\gamma(x)$ and then the distance from $\gamma(x)$ to x' is less than $n - \lfloor n/2 \rfloor$. Assume that the Hamming distance s between x and x' is $\lfloor n/2 \rfloor$, and assume that $[\epsilon_1, \epsilon_2, \ldots, \epsilon_s]$ is a set of cubic functions with minimum cardinality such that $\epsilon_1 \cdot \epsilon_2 \cdot \ldots \cdot \epsilon_s(x) = x'$. Let P$_j$ denote a subset of [1,2,...,s] such that for each i$\epsilon$P$_j$, a block w node (w,j) is connected directly to node $(\epsilon_i(w),j)$. When s is much greater than N$_1$, it is possible that P$_j$ is not empty for every $0 \leq j < N_1$. Since $\epsilon_i \epsilon_j(x) = \epsilon_j \epsilon_i(x)$ for any two cubic functions $\epsilon_i$ and $\epsilon_j$, we can relabel functions $\epsilon_i$ for $1 \leq i \leq s$ such that $P_0 = [1,2, \ldots, I_0]$ and $P_j = [I_{j-1}+1, I_{j-1}+2, \ldots, I_j]$ for $0 < j < N_1$. Thus, $I_{n_1}-1 = s$. For simplicity, let us also assume $y = 0$. It can be seen that the worst possible choice (in terms of the longest of the shortest paths between (x,y=0) and (x',y')) for y' is $y' = \lfloor N_1/2 \rfloor$. Let $\alpha_j$ denote the function $\epsilon_{I_j-1} \ldots \epsilon_2 \epsilon_1$. Therefore, the maximum shortest distance between two vertices (x,y=0) and (x',y' = $\lfloor N_1/2 \rfloor$) is the following path: (x,y=0), ($\alpha_1(x)$,0), . . . ($\alpha I_0(x)$,0), ($\alpha_{I0}(x)$,1), ($\alpha_{I0+1}(x)$,1), . . . ,($\alpha_{I1}(x)$,1), ($\alpha_{I1}(x)$,2), . . . , ($\alpha I_{N_1-1}(x) = \alpha_s(x) = x' \cdot N_1 - 1$), ($\alpha_s(x) = x', N_1 - 2$), . . . , (x',$\lfloor N_1/2 \rfloor$). The path length is about $\lfloor n/2 \rfloor + \lceil 3 \cdot N_1/2 \rceil$. Note that when N$_1$ is small, the diameter is close to $\lfloor n/2 \rfloor$.

Consider two vertices (x,y) and (x',y'). Let HD(x,x') denote the subset of [0,1, ..., n−1] which contains all indexes in which x is different from x'. That is, the cardinality of HD is the Hamming distance of x and x'. Let $\overline{HD}$ denote [0,1, ..., n-1] − HD. When the Hamming distance between x and x' is more than $\lfloor n/2 \rfloor$, we may have to choose a j from $\overline{HD}$ and connect (x,y) to ($\beta_j(x)$,y) before the complement function $\gamma$ can be applied. This algorithm will be better understood from the detailed examples of the routing algorithm presented below.

The routing algorithm for the SMH$_n$(S$_1$) topology is very simple and efficient. The following is an example of a distributed routing algorithm according to a preferred embodiment of the present invention. Assume that processor node (x,y) received a packet of information or data with (x',y') as its destination address and M(y)=[j|0≤j<n−1 and j mod N$_1$=y].

The routing algorithm for forwarding communication packets between nodes in an SMH$_n$(S$_1$) multiprocessor system is as follows:

Step 1
  If (x,y)=(x',y') then terminate (The destination is reached), else proceed to Step 2.

Step 2
  If x=x' and y≠y' then
    If y<y' and (y'−y)≤ ⌈N$_1$/2⌉ then send the packet to node (x,(y,+1) mod N$_1$)
    else if y<y' and (y'−y)⌈N$_1$/2⌉ then send the packet to node (x,(y−1) mod N$_1$)
    else if y>y' and (y'−y)≤ ⌈N$_1$/2⌉ then send the packet to node (x,(y−1) mode N$_1$)
    else if y>y' and (y'−y)< ⌈N$_1$/2⌉ then send the packet to node (x,(y+1) mod N$_1$).

Each of these types of packet transmissions is called inner-block transfers.

This step is possible since the block topology is restricted to a cycle-connected topology in which there is a cycle path in S$_1$. Assume, not loss generality, this path is $$0 \to 1 \to 2 \ldots \to y \to y+1 \to \ldots \to N_1 + 1 \to 0.$$

Step 3
  Compute HD(x,x'), $\overline{HD}$(x,x') and M(y); Note that M(y) is fixed for each node (x,y). Therefore, it can be precomputed and stored at each node location.

Step 4
  If |HD(x,x')| ≤ ⌈n/2⌉ then
    If HD(x,x')∩M(y)≠0 then randomly pick a j in HD(x,x')∩M(y) and send the packet to (β$_j$(x),y)
    else ( i.e., HD(x,x')∩M(y)=0 ) then send the packet to (x,(y+1) mod N$_1$).

Each of these types of packet transmissions is called inter-block transfers.

Step 5
  If |HD(x,x')| ≤ ⌈n/2⌉ then
    If y=n mod N$_1$ then send the packet to (γ(x),y) else
    if $\overline{HD}$(x,x')∩M(y)≠0 then randomly pick a j from HD(x,x')∩M(y) and send the packet to (β$_j$(x),y)
    else send the packet to (x,(y+1) mod N$_1$).

Steps 4 and 5 improve the diameter from d=[d$_1$+1]·d$_2$ to d≤ ⌈n/2⌉+⌈3·N$_1$/2⌉. This is accomplished by using as many inter-block transfers as possible to achieve the shortest path between the source and destination in a substituted topology.

As an example of the operation of the above routing algorithm, consider SMH$_{11}$(C$_4$) where the basic topology SMH$_{11}$ is a Substituted and Modified Hypercube of degree 11 and the block topology C$_4$ is a cycle of four nodes (a 2-cube, not modified). According to the previous terminology assumptions, the address of each node is denoted by (x=x0x$_1$...x10, y=y$_0$y$_1$) and nodes of block x are connected as follows:

1) Node (x,y=00) is connected to the following five nodes: (β$_0$(x),00), (β$_4$(x),00), x),00), (β$_8$(x,01) and (x,11).

2) Node (x,y=01) is connected to the following five nodes: (β$_1$(x),01), (β$_5$(x),01), (β$_9$(x),01), (x,00) and (x,10).

3) Node (x,y=10) is connected to the following five nodes: (β$_2$(x),10), (β$_6$(x),10), (β$_{10}$(x),10), (x,01) and (x,11).

4) Node (x,y=11) is connected to the following five nodes: (γ(x),11), (β$_3$(x),11), (β$_7$(x),11), (x,10) and (x,00).

(The remaining connections with in this Substituted Topology are intuitively obvious.)

Assume that Node (00000000000,01) wants to send a packet to Node (11101011010,11). Then the following sequence of operations are carried out by each node which receives this packet.

1) Source node (00000000000,01) first computes HD=[0,1,2,4,6,7,9], $\overline{HD}$=[3,5,8,10], and M(01)=[1,5,9]. Since |HD|=7>⌈n/2⌉ and 5 is the only index in M(01)∩HD, this packet is sent to Node (00000100000,01).

2) After Node (00000100000,01) receives this packet, it computes HD=[0,1,2,4,5,6,7,9], $\overline{HD}$=[3,8,10], and M(01)=[1,5,9]. Since $\overline{HD}$∩M(01)=0, this packet is sent to Node (00000100000,10).

3) After Node (00000100000,10) received this packet, it computes HD=[0,1,2,4,5,6,7,9], $\overline{HD}$=[3,8,10], and M(10)=[2,6,10]. Since |HD|=8>⌈n/2⌉=5 and 10 is the only index in HD∩M(10), the packet is sent to Node (00000100001,10).

4) For Node (00000100001,10) HD=[0,1,2,4,5,6,7,9,10], $\overline{HD}$=[3,8], and M(01)=[2,6,10]. Since HD∩M(10)=0, Node (00000100001,10) will send this packet to Node (00000100001,11).

5) Since |HD|>⌈n/2⌉ and 11$_{10}$mod4$_{10}$=11$_2$, the complement function is indicated to find the shortest path and this packet is forwarded to Node (γ(00000100001),11). That is, Node (11111011110,11). (The subscript 10 indicates decimal number system and subscript 2 indicates binary number system.)

6) For Node (11111011110,11), HD=[3,8], and M(11)=[3,7]. Therefore this packet is sent to Node (11101011110,11).

7) For Node (11101011110,11), HD=[8]and M(11)=[3,7]. Since HD∩M(11)=0, this packet is sent to Node (11101011110,00).

8) For Node (11101011110,00), HD=[8]and M(00)=[0,4,8]. Therefore, this packet is sent to Node (11101011010,00).

9) At last Node (11101011010,00) sends the packet to its destination Node (11101011010,11) within the same block.

Fixing the Degree or Diameter

When the degree of the resulting topology has to be 3, the only possible SMH$_n$ topology is SMH$_n$(C$_{n+1}$), where C$_{n+1}$ is a ring (cycle) topology with n+1 nodes. According to the previously defined terminology, let PROP(SMH(C$_{n+1}$))=(N,p,d). Then the number of nodes N=(n+1) 2$^n$, the number of ports or degree p=3 and the diameter d is roughly 2·n (or 2·(log$_2$N−log$_2$n+1)). This topology is similar to the previously proposed cube-connected cycles. However, its diameter is shorter than the diameter of cube-connected cycles due to the use of a Modified Hypercube as the basic topology. Since the degree of a ring is two, in order to keep the degree of the resulting substituted topology to be 3 the number of nodes in the ring can not be too small. This will effectively keep the diameter big (i.e., compared with $\log_2 N/2$).

When the desired degree is 4 and the two block topologies used in the substituting scheme are $MH_n$ and $S_1$, then $S_1$ can be either a ring of $k = \lceil (n+1)2 \rceil$ nodes or a topology of degree 3 with $n+1$ nodes. In the former case, $N = k \cdot 2^n$ and the diameter of D is roughly $\lfloor n/2 \rfloor + \lceil k + k/2 \rceil$ (i.e., less than $3/2 \cdot \log_2 N$). In the latter case, S can be any topology of degree 3 mentioned above. For instance, the block topology $S_1$ can be a chordal ring of $n+1$ nodes. Therefore, in the resulting topology $N = (n+1) \cdot 2^n$ and d is roughly $\lfloor n/2 \rfloor + (n+1) + \sqrt{n+1} < 3/2 \cdot \log_2 N$.

It can be seen from the foregoing that there is a family of $SMH_n$ topologies similar to the cycle connected cube but with shorter diameter and better properties, such as those described above. The two simple cases discussed above for fixing the degree are not limited, and other examples are easily derived by those skilled in the art. By fixing the degree, a designer of a multiprocessor system can start with the maximum desired number of ports per microprocessor to build the largest multiprocessor feasible for the amount of overhead the system can support due to the size of the diameter of the system.

The topologies discussed above can be programmed to emulate other structures such as the cube-connected cycle (CCC) algorithm. All CCC algorithms can easily be embedded into the $SMH_n$ topology. However, the basic $SMH_n$ topology is more robust and has better mapping flexibility than the CCC, and hence is preferred.

When the diameter of the resulting topology is the primary concern, $S_1$ should be a topology with few number of nodes. For instance, in $SMH_n(C_4)$, $N = 4 \cdot 2^n = 2^{n+2}$, the degree $p = 2 + \lceil [n+1]/4 \rceil = \lceil \frac{1}{4} \cdot ((\log_2 N) - 1) + 2 \rceil$ and the diameter $d = \lfloor n/2 \rfloor + 5$ (i.e., roughly $\frac{1}{2} \cdot \log_2 N$ when N is large).

In $SMH_n(H_3)$, where $H_3$ is the binary hypercube of 8 nodes, $N = 2^{n+3}$, $p = \lceil (n+1)/8 \rceil + 3$, and $d = \lfloor n/2 \rfloor + 8 - 3 = \lceil \log_2 N - 3)2 \rceil + 11$. Therefore, the diameter of the resulting can be fairly close to $\frac{1}{2} \cdot \log_2 N$ and the degree can be close to $\frac{1}{4}$ or $\frac{1}{8}$ of $\log_2 N$.

Using the above example and applying it to the prior art NCUBE/10 machine, a more efficient structure can be created using fewer ports and resulting in a greater number of nodes. The basic NCUBE/10 processor node supports ten I/O ports in a 10-cube configuration to allow it to communicate with other processors in the system. In this prior art system, the number of processors $N = 1,024$, the diameter $d = 10$, and the number of ports or degree $p = 10$. Using an $SMH_{10}(MH_2)$ topology applied to the prior art NCUBE/10 processor nodes, an improvement in the number of nodes that the multiprocessor can support can be achieved while keeping the diameter constant and reducing the actual number of ports required for implementation. For example, in this basic topology is a Modified Hypercube $MH_{10}$. In this hypercube, the number of nodes $N_2 = 2^{10}$ or 1,024 nodes. The diameter of $MH_{10}$ is $d_2 = 9$, and the number of ports required $p_2 = 11$. By taking a simple Modified Hypercube $MH_2$ as the block topology, an improvement in the overall structure can be gained. For $MH_2$, the number of nodes $N_1 = 2^2$ or 4 The diameter $d_1 = 1$, and the number of ports required $p_1 = 3$. Using the formulas discussed above and the terminology defined above, for $SMH_{10}(MH_2)$, $N = N_1 \cdot N_2 = 4,096$ nodes. The diameter of this system is $d = 9$. The number of ports required in this Substituted and Modified Hypercube topology is a maximum of 6. Hence, the number of ports required to implement this system and the diameter have actually been reduced. The result is a superior multiprocessor system with four times the nodes of the NCUBE/10 machine and better robustness.

Thus, a new class of SMH topologies has been invented. Its degree can be ranged from 3 to $\log_2 N$. Therefore, a designer of a multicomputer can choose one of the topologies which fits his needs. Compared with similar topologies of the same degree and of the same number of nodes, the diameter of this class of topologies is usually shorter and it is also more robust. Just like hypercube topology, the routing logorithm can be used in this class of topologies is very easy and efficient.

The preferred embodiments of the present invention present many advantages over the prior art. The diameter has been reduced, since the modified hypercube is employed as the basic topology. The degree of the topology can be reduced by the substituting scheme. This also offsets the increased degree resulted from using a modified hypercube instead of using a hypercube as the basic topology in the substituting scheme. The robustness of the SMH topologies is better than that of hypercube. This is due to the fact that each node in the hypercube is replaced by a set of nodes (i.e., a block topology). Therefore, the number of paths between two nodes in the original hypercube is less than the number of paths between two nodes chosen from two block topologies in a SMH topology which correspond to the two nodes in the hypercube. There is no congestion or bottleneck in the communication flow of SMH topologies. The routing algorithm is very easy and efficient.

Although specific logic configurations have been illustrated and described for the preferred embodiments of the present invention set forth herein, it will be appreciated by those of ordinary skill in the art that any conventional logical arrangement which is calculated to achieve the same purpose may be substituted for the specific configurations shown. Thus, although the preferred embodiments have been described in terms of interprocessor communications for parallel processing computers, those skilled in the art will readily recognize the application of these techniques to inter-node communication where the nodes may be communication routers, telephone switching exchanges, and other types of communication networks.

While the present invention has been described in connection with the preferred embodiments thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A modified hypercube computing system, comprising:
   a plurality of $2^n$ processor nodes, where n is a whole integer greater than two, in an n-dimensional hypercube configuration having first bidirectional communication paths along the edges only of said hypercube;
   second bidirectional communication paths only directly connecting each of said processor nodes to the processor nodes' most distant processor node, which requires the greatest number of nodal hops over the shortest path, such that the total number of bidirectional communication paths does not exceed $(2^{n-1})(n+1)$; and whereby said first and second bidirectional communications paths are substantially identical and the total number of communication paths connected to each processor node does not exceed $(n+1)$.

2. The system according to claim 1 wherein each of said processor nodes is a single processing element.

3. The system according to claim 2 wherein the number of second bidirectional communication paths connecting each node to its most distant processor node is one.

4. The system according to claim 1 wherein each of said processor nodes is a substituted topology comprising a plurality of processors.

5. The system according to claim 4 wherein each substituted topology has the same topology.

6. The system according to claim 4 wherein each substituted topology is arranged as a cycle-connected topology.

7. The system according to claim 4 wherein each substituted topology is arranged as a hypercube topology.

8. The system according to claim 4 wherein each substituted topology is arranged as a modified hypercube topology.

9. A multiprocessor computing system, comprising:

a plurality of $2^n$ substituted topologies, where n is a whole integer greater than two, wherein each substituted topology comprises a plurality of processors and a first communications network connecting said processors;

a second communications network connecting said substituted topologies in a modified hypercube topology, said modified hypercube topology being connected with first communication paths in a hypercube topology and with additional communication paths only directly connecting each substituted topology to the substituted topology's most distant substituted topology which requires the greatest number of substituted topology hops over the shortest path, such that the total number of first communication paths in said second communications network does not exceed $(2^{n-1})(n+1)$; and whereby said first and additional communications paths are substantially identical and the total number of communication paths connected to each of said substituted topologies does not exceed $(n+1)$.

10. The system according to claim 9 wherein each substituted topology is arranged as a modified hypercube topology.

11. The system according to claim 9 wherein each substituted topology is arranged as a cycle-connected topology.

12. The system according to claim 9 wherein each substituted topology is arranged as a hypercube topology.

13. A multicomputer system, comprising:

a plurality of $2^n$ computing systems, where n is an integer greater than two, wherein each computing system comprises a plurality of processors and a first communications network having first communications paths connecting said processors; and a second communications network connecting said computing systems in a modified hypercube topology, said modified hypercube topology being a hypercube topology with additional communication paths only directly connecting each computing system to the computing sytem's most distant computing system, which requires the greatest number of system hops over the shortest path, such that a combined total number of said first and additional communication paths does not exceed $(2^{n-1}(n+1)$; and whereby said first and additional communications path are substantially identical and the total number of communication paths connected to each of said computing systems does not exceed $(n+1)$.

14. A parallel processor computing system, comprising:

an n-dimensional hypercube having a plurality of $2^n$ processor nodes, where n is a whole integer greater than two and having first data communication paths directly connecting each of said processor nodes to an adjacent neighbor processor node along the edges of said hypercube;

second data communication paths within said hypercube directly connecting each of said processor nodes to a most distant processor node, which requires the greatest number of nodal hops over the shortest path, within said hypercube such that the total number of data communication paths does not exceed $(2^{n-1})(n+1)$; and whereby said first and second data communications paths are substantially identical and the number of data communication paths connected to each processor node does not exceed $(n+1)$.

* * * * *

UNITED STATES PATENT AND TRADEMARK OFFICE
CERTIFICATE OF CORRECTION

PATENT NO. : 5,170,482

DATED : December 8, 1992

INVENTOR(S) : Renben Shu et al.

It is certified that error appears in the above-identified patent and that said Letters Patent is hereby corrected as shown below:

Title page, item [57]
In the abstract, line 21, "n" should read --in-- therefore.

In column 3, line 10 and 20, "Fig." should read --Figs.-- therefore.

In column 4, line 2, "a-vertex" should read --a vertex-- therefore.

In column 4, line 35, "teh" should read --the-- therefore.

In column 4, line 45, "notes" should read --nodes-- therefore.

In column 4, line 68, insert --(where N -- after the word "$\sqrt{N}$" therefore.

In column 5, line 22, "5/2 log$_2$" should read --5/2•log$_2$-- therefore.

In column 7, line 45, "transfers" should read --transfer-- therefore.

In column 9, line 38, "5/2 log$_2$" should read --5/2•log$_2$-- therefore.

In column 9, line 8, "$\lceil p_2 N_1 \rceil$" should read -- $\lceil p_2/N_1 \rceil$ -- therefore.

UNITED STATES PATENT AND TRADEMARK OFFICE
CERTIFICATE OF CORRECTION

PATENT NO. : 5,170,482
DATED : December 8, 1992
INVENTOR(S) : Renben Shu, et. al.

It is certified that error appears in the above-indentified patent and that said Letters Patent is hereby corrected as shown below:

In column 9, line 60, "$d \leq (d_2+1) - d_1.$" should read -- $d \leq (d_2+1) \cdot d_1.$ -- therefore.

In column 10, line 34, "$d(d_2+1).$" should read -- $d_1 \cdot (d_2+1).$ -- therefore.

In column 10, line 49, "$i/i_o]$" should read -- $i_1 i_o]$" -- therefore.

In column 10, line 52, "$0 \leq j \leq n-1$" should read -- $0 \leq j \leq n-1$ -- therefore.

In column 10, line 60, "$i(0 \leq i \leq 2^n-1)$" should read -- $i(0 \leq i \leq 2^n-1)$ -- therefore.

In column 11, lines 32 and 43, "$MH_2$" should read -- $MH_n$ -- therefore.

In column 12, line 23, "$MH_2$" should read -- $MH_n$ -- therefore.

In column 12, line 26, "$0 \leq x < 2^n$ and $0 > y < N1$" should read -- $0 \leq x < 2^n$ and $0 \leq y < N1$ -- therefore.

In column 12, lines 38 and 39, insert --.-- after "vertices" therefore.

UNITED STATES PATENT AND TRADEMARK OFFICE
CERTIFICATE OF CORRECTION

PATENT NO. : 5,170,482

DATED : December 8, 1992

INVENTOR(S) : Renben Shu et al.

It is certified that error appears in the above-identified patent and that said Letters Patent is hereby corrected as shown below:

In column 12, 13, 16, and 17, lines 40, 5, 42, and 7 respectively, "$0 \leqq j$" should read --$0 \leq j$-- therefore.

In column 12, line 59, "$0 \leqq y$" should read --$0 \leq y$-- therefore.

In column 13, 14 and 15, lines 3, 47, and 32 respectively, "$SMH_2$" should read --$SMH_n$-- therefore.

In column 13, line 4, "$n+1 \leqq N_1$" should read --$n+1 \geq N_1$-- therefore.

In column 13, line 17, "$0 \leqq i$" should read --$0 \leq i$-- therefore.

In column 13, line 31, insert --diameter-- after the "a" therefore.

In column 14, line 48, "$SMH_{12}$" should read --$SMH_{15}$-- therefore.

In column 15, line 37, "embodiment" should read --embodiments-- therefore.

In column 16, line 44, insert --$1 \leq i \leq s$" should read --$1 \leq i \leq s$-- therefore.

In column 16, line 45, "$Ij$" should read --$I_j$-- therefore.

In column 16, line 49, "$\alpha j$" should read --$\gamma j$-- therefore.

UNITED STATES PATENT AND TRADEMARK OFFICE
CERTIFICATE OF CORRECTION

PATENT NO. : 5,170,482

DATED : December 8, 1992

INVENTOR(S) : Renben Shu et al.

It is certified that error appears in the above-identified patent and that said Letters Patent is hereby corrected as shown below:

In column 16, line 52, "($\alpha j$" should read --($\gamma j$-- therefore.

In column 16, line 52, "($\alpha I_{10}$" should read --($\gamma 10$-- therefore.

In column 16, line 53, "($\alpha_{10}$" should read --($\gamma_{10}$-- in both occurances therefore.

In column 16, line 53, "($\alpha_{11}$" should read --($\gamma_{11}$-- in both occurances therefore.

In column 16, line 54, "($\alpha I_{N1}$" should read --($\gamma I_{N1}$--, "$-\alpha_s$" should read --=$\gamma_s$--, and "($\alpha_s$" should read --($\gamma_s$-- therefore.

In column 17, line 7 "0$\leq$j" should read --0$\leq$j-- therefore.

In column 17, line 9, delte "30" after the word "communication" therefore.

In column 17, lines 16, 20, 38 and 54, "$\leq$" should read --$\leq$-- therefore.

In column 17, line 18, insert -->-- after the sequence "-y)" therefore.

In column 17, line 47, "$\leq$" should read -->-- therefore.

In column 17, line 64, "(x=x0$x_1$...x10, y=$y_0 y_1$)" should read --(x=$x_0 x_1$...$x_{10}$, y=$y_0 y_1$) therefore.

UNITED STATES PATENT AND TRADEMARK OFFICE
CERTIFICATE OF CORRECTION

PATENT NO. : 5,170,482

DATED : December 8, 1992

INVENTOR(S) : Renben Shu et al.

It is certified that error appears in the above-identified patent and that said Letters Patent is hereby corrected as shown below:

In column 17, line 67, "x),00), ($\beta_8$(x,01)" should read --($\beta_8$(x),00),(x,01)-- therefore.

In column 18, line 10, "with in" should read --within-- therefore.

In column 18, lines 19 and 28, "HD" should read --$\overline{HD}$-- therefore.

In column 18, line 61, insert --·-- after the letters "(n+1)" therefore.

In column 19, line 9, "+⌈k+k/2⌉" should read --+k+⌈k/2⌉-- and "S" should read --$S_1$-- therefore.

In column 19, line 38, "-1)+2]" should read ---1)]+2-- therefore.

In column 19, line 42, "⌈log$_2$N-3)2⌉" should read --⌈(log$_2$N-3)/2⌉-- therefore.

UNITED STATES PATENT AND TRADEMARK OFFICE
CERTIFICATE OF CORRECTION

PATENT NO. : 5,170,482
DATED : December 8, 1992
INVENTOR(S) : Renben Shu, et. al.

It is certified that error appears in the above-indentified patent and that said Letters Patent is hereby corrected as shown below:

In colum 19, line 43, insert --topology-- after the word "resulting" therefore.

Signed and Sealed this

Fifteenth Day of March, 1994

BRUCE LEHMAN

Attest:

Attesting Officer

Commissioner of Patents and Trademarks